March 2, 1954     F. W. CHALMERS     2,670,964
LOAD CARRYING ATTACHMENT FOR LAWN MOWERS
Filed Jan. 21, 1952
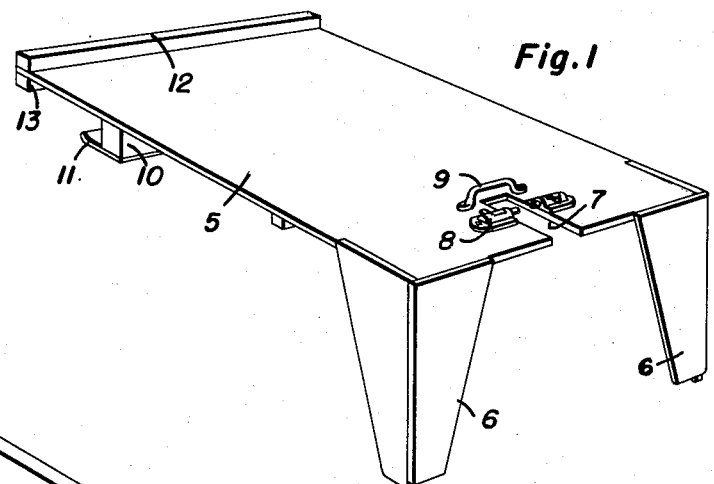
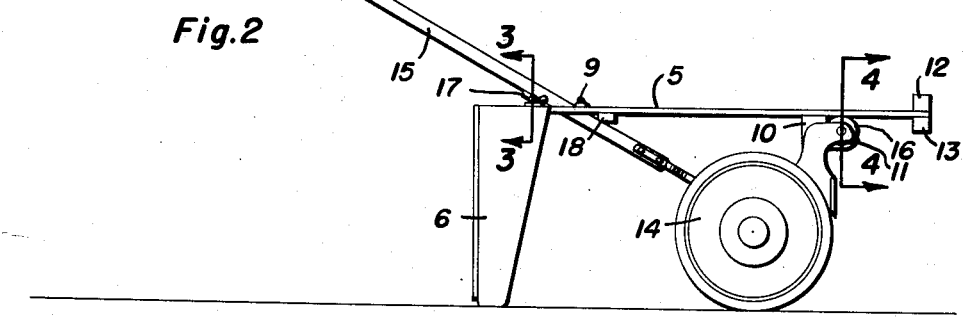
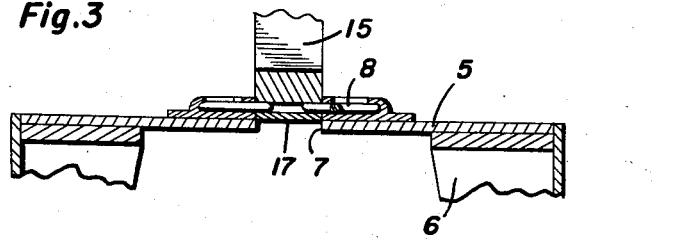
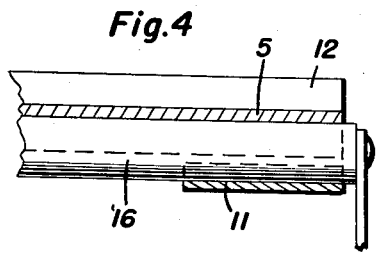
Frederick W. Chalmers
*INVENTOR.*

Patented Mar. 2, 1954

2,670,964

UNITED STATES PATENT OFFICE 2,670,964

LOAD CARRYING ATTACHMENT FOR LAWN MOWERS

Frederick W. Chalmers, Grosse Pointe, Mich.

Application January 21, 1952, Serial No. 267,346

1 Claim. (Cl. 280—47.18)

The present invention relates to new and useful improvements in attachments for use with lawn mowers whereby the latter may be converted into a hand truck.

An important object of the present invention is to provide an attachment of this character embodying a platform which may be easily and quickly attached in position to a lawn mower and on which various objects may be placed for transporting the same to a desired location.

Another object of the invention is to provide a means for locking the platform to the handle of the lawn mower to secure the platform in load carrying position.

A still further object is to provide a device of this character simple and practical in construction, which is strong and durable, relatively inexpensive to manufacture and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the load carrying platform detached from the lawn mower;

Figure 2 is side elevational view showing the platform attached to the lawn mower;

Figure 3 is an enlarged transverse sectional view taken on a line 3—3 of Figure 2; and, Figure 4 is an enlarged fragmentary sectional view taken on a line 4—4 of Figure 2 and showing the clip for attaching the platform to the roller of the lawn mower.

Referring now to the drawing in detail wherein for the purpose of illustration I have disclosed a preferred embodiment of the invention the numeral 5 designates a platform preferably constructed of light-weight wood or other suitable material and having legs 6 attached at one end thereof.

The end of the platform adjacent to legs 6 is formed with a longitudinal slot 7 and one or more sliding bolts 8 are attached on top of the platform for sliding movement transversely with respect to the slot which is of a width to straddle and fit opposite sides of the handle 15 of the lawn mower. A carrying handle 9 is also attached to the top of the platform adjacent slot 7.

A cleat 10 is secured in a transverse position to the underside of the platform adjacent the end of the latter opposite from the legs 6 and a clip 11 is secured to the lower edge of the cleat to space the clip from the underside of the platform. Upper and lower reinforcing cleats 12 and 13 are also secured to the end of the platform opposite from leg 6 and the upper cleat 12 functions as a stop to prevent objects placed on the platform from sliding therefrom.

The platform is secured in position to a lawn mower 14 after the handle 15 of the lawn mower has been swung out of its grass cutting position and with the roller 16 of the mower raised above the wheels thereof. The handle 15 is then placed in slot 7 and the bolts 8 lock in keepers 17 attached to the handle 15 beneath the same. In this position the legs 6 will be placed under the handle 15 as shown in Figure 2 of the drawing, to support the platform 5 in a horizontal position and to support the handle in a raised position.

The front end of platform 5 rests on the roller 16 and is locked to the platform by the clip 11.

A transverse cleat 18 is also attached to the underside of platform 5 adjacent its rear end and said slot 7 in front of the slot to rest on the handle 15 to support the load on the handle and to relieve the bolts 8 of the weight thereof.

In the operation of the device the handle 15 is swung to place the mower in a non-cutting position and with the roller 16 uppermost. The platform 5 is then placed in position over the mower with the handle in the slot 7 and locked thereto by the bolts 8. The roller 16 is held in the clip 11 so that the roller supports the front end of the platform. The cleat 18 rests on the handle and supports the rear of the platform.

Various articles may be placed on the platform to thus convert the mower into a handtruck.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

Means for attaching the rear end of a platform to the handle of an inverted lawn mower, said platform adapted to rest at its front end on the roller of the inverted lawn mower, said means comprising a slot in said rear end of the platform adapted to straddle and fit opposite sides of the handle, keepers on the underside of the handle, a pair of slide bolts on said platform at opposite sides of the slot engageable with said keepers, and a cross cleat on said platform adjacent said slot and in front thereof and adapted to rest on top of the handle to support said platform on said handle.

FREDERICK W. CHALMERS.

References Cited in the file of this patent

UNITED STATES PATENTS

| Number | Name | Date |
| --- | --- | --- |
| 1,113,479 | Phipps | Oct. 13, 1914 |
| 1,338,144 | McNeill | Apr. 2, 1920 |
| 1,478,293 | Parsons | Dec. 18, 1923 |
| 1,866,380 | Wagner | July 5, 1932 |
| 2,502,138 | Forfeit | Mar. 28, 1950 |